May 24, 1927.
A. F. ANDERSON
1,629,647
BRAKE EQUALIZING MECHANISM
Filed May 4, 1925
2 Sheets-Sheet 1
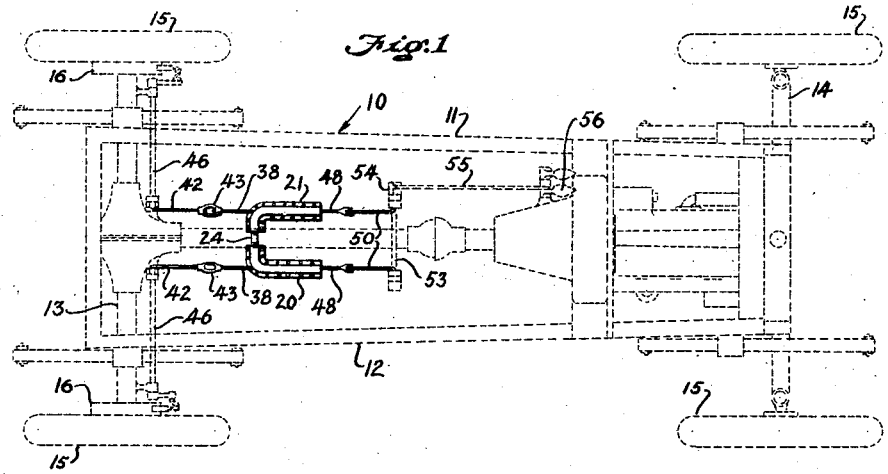
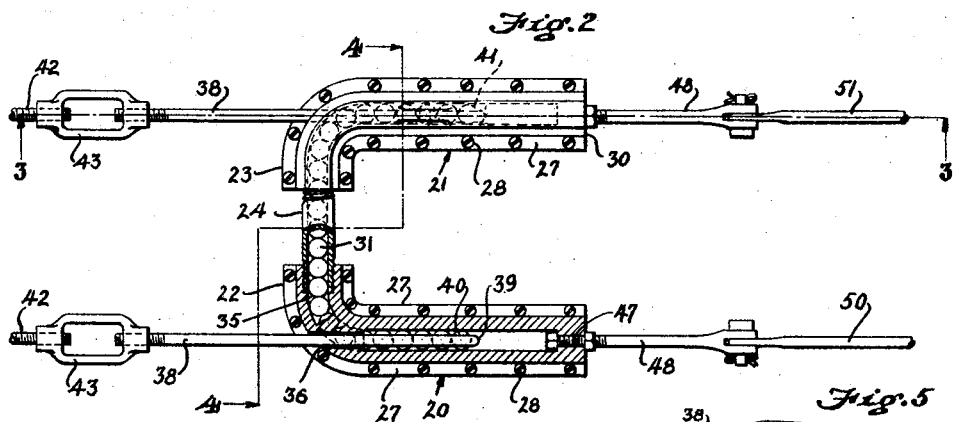
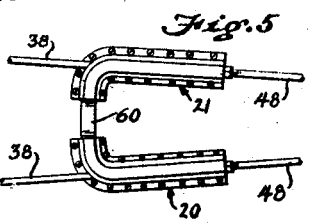
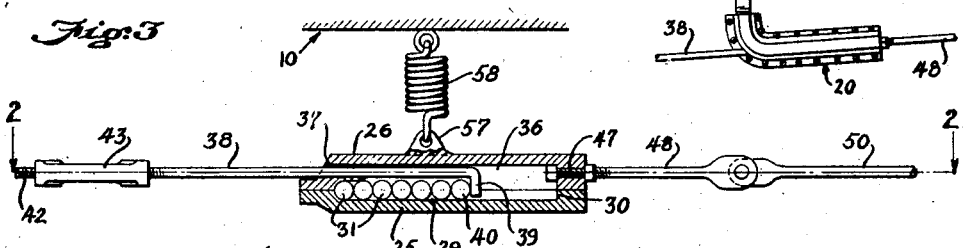
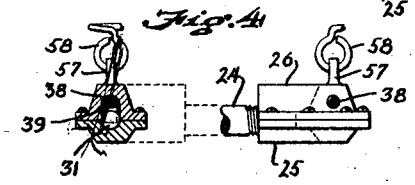
INVENTOR
ALBERT F. ANDERSON
BY
ATTORNEY May 24, 1927.
A. F. ANDERSON
1,629,647
BRAKE EQUALIZING MECHANISM
Filed May 4, 1925      2 Sheets-Sheet 2
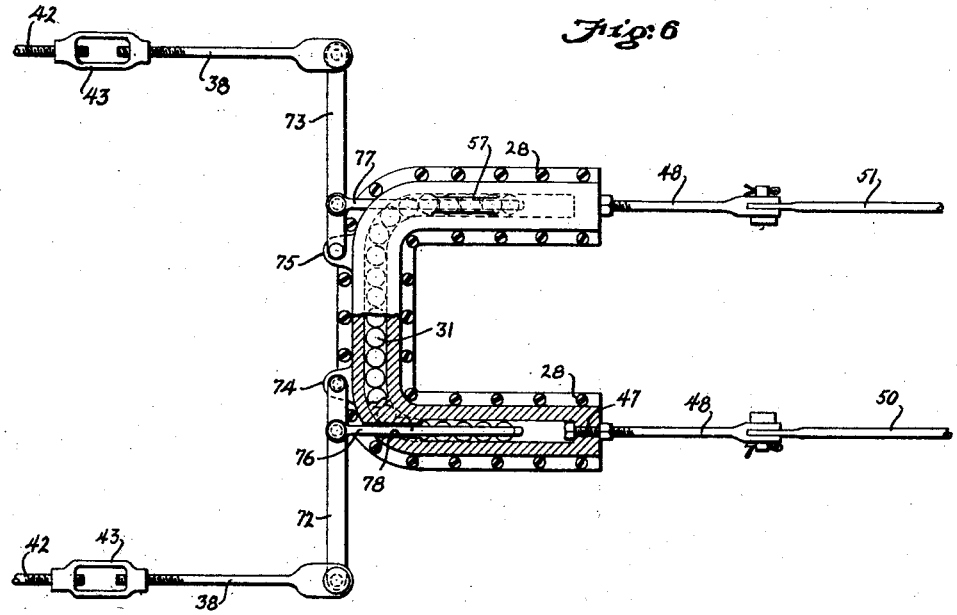
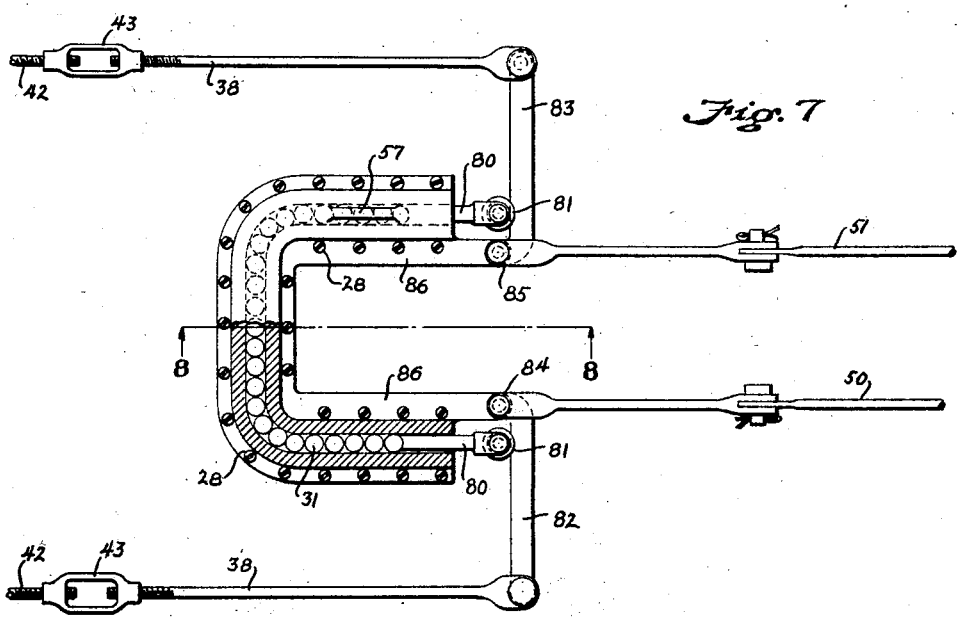
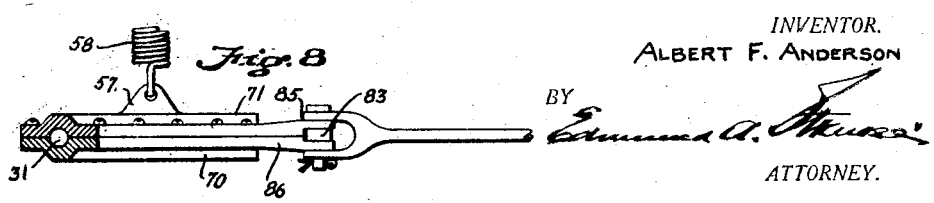
INVENTOR.
ALBERT F. ANDERSON
BY
ATTORNEY.

Patented May 24, 1927.

1,629,647

UNITED STATES PATENT OFFICE.

ALBERT F. ANDERSON, OF PASADENA, CALIFORNIA.

BRAKE-EQUALIZING MECHANISM.

Application filed May 4, 1925. Serial No. 27,708.

This invention relates more specifically to automobile braking mechanisms.

An important object of the invention is to provide a simple mechanism that may be readily connected to the wheel brake mechanisms of automobiles to equalize the pull exerted on the brake bands during a braking operation.

A further object is to provide a brake equalizing mechanism that is of simple construction, easy of operation, and which may be readily applied to existing autovehicle braking mechanism without substantially changing their construction.

A still further object is to provide a brake equalizing mechanism in which the equalizing operation occurs prior to the application of the brake bands.

This disclosure is to be regarded as descriptive only and not as restrictive or limitive of the invention, of which obviously an embodiment may be constructed including many minor modifications without departing from the general scope herein indicated and hereinafter claimed.

The above and other objects are accomplished by means of the mechanism described herein, reference being had to the drawings hereunto annexed, in which:

Fig. 1 is a plan view of an automobile frame in dotted lines, showing the brake equalizing mechanism in full lines applied to the braking mechanism.

Fig. 2 is a plan view partly in section of the brake equalizer.

Fig. 3 is a longitudinal section of the brake equalizer taken on line 3—3 of Fig. 2.

Fig. 4 is a transverse section taken on line 4—4 of Fig. 2.

Fig. 5 is another form of brake equalizer showing the method of connecting the same directly to a pair of hand brakes.

Fig. 6 is a plan view partly in section of the brake equalizer showing another form of brake rod connections.

Fig. 7 is a view similar to the above, showing still another form of brake rod connections.

Fig. 8 is a longitudinal section of the brake equalizer taken on line 8—8 of Fig. 7.

In automobile braking systems of the type in which a single pedal is used for operating simultaneously the rear band brakes, the brake rods are frequently thrown out of adjustment due to the vibration of the vehicle, and as a consequence the brake band linings become so unequally worn as to seriously affect an efficient braking action when power is applied thereto. Frequently when such a condition arises the braking power is applied to only a single drum with the result that when a vehicle is traversing a slippery roadway, dangerous "skidding" oftentimes results. Moreover, when the brakes of a vehicle are unequally applied, the strain imposed on the single wheel usually results in uneven wear of the pneumatic tires, causing a loosening of the bolts, nuts, rivets, and generally affecting the entire mechanism.

By means of the herein described braking mechanism the above recited disadvantages of autovehicle braking systems are obviated, the braking force being at all times equally distributed to both band brakes on an operation.

Briefly the equalizing mechanism consists of a U-shaped member provided with a ball raceway in which a plurality of steel balls are disposed, the space occupied by the balls being less than the length of the raceway in order to provide space for their movement on an equalizing movement of the braking mechanism. The equalizing member is connected to and interposed in the usual brake operating rods of the vehicle, the rear rod sections having hooked ends and engaging the end balls in the raceway. Coiled springs are provided for suspending the weight of the equalizer from the body of the vehicle, providing at the same time for its movement when the brakes are operated.

In the drawings, 10 designates the frame of an auto vehicle, shown in Fig. 1 in dotted lines, of usual construction, consisting of channelled side beams 11, 12, a rear axle 13, and front axle 14, having vehicle wheels 15, secured to their spindles. The rear wheels are provided on their inner faces with brake drums 16, and externally expanding brake bands being operatively connected thereto, all of the above described mechanisms being of usual form and connected in the usual manner.

The brake equalizing mechanism preferably consists of a pair of cast metal members 20, 21, having angular oppositely disposed ends 22, 23, secured together by a threaded nipple 24. Each member is formed in two parts 25, 26, having longitudinally extending side flanges 27, that are secured together by means of screws 28. Members 25 are provided with ball raceways 29 that extend from their closed ends 30 to the ends of the nipple 24, thus forming a raceway of U-shaped configuration. Disposed in the raceways 29 are a plurality of steel balls 31, the length of the row of balls when assembled being considerably less than the length of the raceways in order to provide for an equalizing movement as will be described further on.

The upper members 26 of the equalizer are provided on their under contacting faces at their angular ends with grooves 35, semicircular in cross section, and deeper grooves 36 in their straight portions. Members 26 are also provided with cylindrical bores 37, on their angular ends that communicate with the grooves 36, the front sections 38 of the brake rods passing therethrough, their ends being turned downwardly to form hooks 39 that engage the end balls 40, 41, in the raceways. The sections 38 and 42 of the brake rods are connected together by turnbuckles 43. By means of these turnbuckles the brake mechanism may be quickly adjusted, or if the brake pedal has too much play either one of the turnbuckles may be adjusted to "take up" the play, the equalizing mechanism adequately taking care of any inequalities of adjustment. The free ends of the brake rod sections are pivotally attached to levers, secured to the oppositely disposed ends of a pair of rock shafts 46 that are in turn connected to the brake bands in the usual manner. Members 26 at their forward straight ends are provided with bores 47 for the reception of the threaded ends of the rear section 48, of the forward brake rods, nuts holding the sections in rigid relation to the members 26. The forward ends of rod sections 48 are forked, and pivotally attached thereto are the forward rod sections 50, 51, the free ends of the sections being pivotally attached to levers secured to either end of a rock shaft 53, mounted in bearings secured to the vehicle body in the usual manner. One end of rock shaft 53 is provided with an additional lever 54, to which a pull rod 55 leading to the brake pedal 56 is pivotally secured.

In order that the weight of the equalizer mechanism will not be imposed on the brake pull rods, each member 26 has an upstanding lug 57 formed on its upper surface. Coiled springs 58 pivotally secured to the frame 10 of the vehicle engage the apertured lugs 57 and resiliently support the weight of the equalizing mechanism, and at the same time permit of its movement during an operation of the brake pull rods.

In the form illustrated the equalizing mechanism is shown as adapted for use with vehicles provided with a pair of rock shafts through which the brakes are operated. In vehicle constructions where the brake pull rods are directly attached to the brake mechanisms the members 20, 21, are arranged at an angle to each other, as clearly shown in Fig. 5, the nipple 60 being of curved form in order to dispose the members 20, 21, at the desired angle, the operation being exactly the same as the form first described.

In Figs. 6, 7 and 8, I have illustrated other forms of brake equalizer, the action of said modified forms being substantially the same as the form first described. By the use of these modified forms, it will be possible to apply the brake equalizer to cars of various makes, also enabling an attachment of the same through the rear sections of the pull rods directly to the braking mechanism.

The form illustrated in Fig. 6 is substantially the same as the form illustrated in Figs. 1, 2 and 3, with the exception that instead of forming the cast metal members in two sections, it is formed in a single casting consisting of a lower plate 70, and an upper plate 71, bolted or otherwise secured together. The front ends of the rear sections 38 of the brake rods are pivotally connected to the outer ends of a pair of transversely disposed levers 72, 73, whose inner ends are in turn pivotally secured to bearings 74, 75, formed on the metal equalizing frame. Pivoted to levers 72, 73, intermediate their ends are pull rods 76, 77, said rods passing through bores 78 formed in the upper plate 71, their extreme ends being turned downwardly to form hooks for engaging the end balls disposed in the raceway, as in the form first described. It will be understood that the bores 78 are slightly greater in diameter than the diameter of the pull rods 76, 77, in order that no binding will occur on an operation of the same. By providing the construction above described it will be obvious that the rear sections of the brake pull rods may be directly connected to the rear wheel brakes of a vehicle, the rock shafts 46 illustrated in the first form being dispensed with.

The form illustrated in Fig. 7 is also substantially the same as in the other forms described, with the exception that instead of employing hooked pull rods, push rod plungers 80 are employed. These plungers are disposed in the ends of the ball raceways of the equalizer frame, and their outer ends are provided with small grooved wheels 81 mounted in suitable bearings. These wheels engage one of the side edges of a pair of transversely disposed levers 82, 83, whose oppositely disposed inner ends are pivotally secured to bearings 84, 85, formed on the outer ends of the inner flanges 86, of the equalizer frame sections. The outer free ends of these levers are pivotally connected to the outer ends of the rear brake rod sections as in the form illustrated in Fig. 6, and the rear ends of the forward sections of the brake rods are pivotally connected to the lever bearings 84, 85. The mode of operation of this form is exactly the same as the preceding forms, and the connection to the rear brake mechanism can be made in the manner as described in the form shown in Fig. 6.

As the leverage in the above forms (Figs. 6 and 7) is approximately one to five (1 to 5), it will be seen that an equalization of the brake pull rods will instantly occur on a depression of the brake pedal, thus effecting an equalization operation prior to a contact of the brake bands with their drums, thus causing a simultaneous action of the brakes to their drums.

From the above description it will be apparent that the pull exerted on the brake mechanisms during a braking operation will at all times be absolutely equal, due to the fact that the balls are engaged by the hooked outer ends of the rear brake pull rods, and that the length of the raceway is great enough to permit of a movement of the balls therein on a braking operation.

What I claim is:

1. In a brake equalizing mechanism, in combination with a power propelled vehicle provided with a pair of wheel brakes and a brake operating pedal, a pair of brake pull rods divided into front and rear sections, the rear sections being pivotally secured to the wheel brake mechanisms and the front sections to the vehicle brake pedal, a frame member provided with a ball raceway rigidly secured to the free ends of the front pull rod sections, a plurality of balls disposed in said raceway, the space occupied by the balls being less than the length of the raceway, the free ends of the rear pull rod sections engaging the end balls in the raceway, whereby on a braking operation the pull exerted by the rear rod sections on the wheel brakes will be equalized.

2. In a brake equalizing mechanism, in combination with an autovehicle provided with a pair of wheel brakes and a brake pedal, of a pair of brake rods operatively connected to the vehicle wheel brakes and brake pedal, said rods being divided into front and rear sections, and an equalizing mechanism connecting the sections of each brake rod, the front brake rod sections being rigidly secured to said equalizer and the rear brake rod sections being movably secured thereto, whereby on an operation of the brake rods the rear brake rod sections will exert an equal pull on the wheel brakes.

3. In a brake equalizing mechanism, in combination with a vehicle frame provided with wheel brakes and a brake operating pedal, a pair of brake actuating rods connected to the wheel brakes and to the operating pedal, said rods being divided into front and rear sections, the free end of the rear rod sections having hooked ends, a frame having a substantially U-shaped ball raceway rigidly secured to the free ends of the front rod sections, a plurality of balls in said raceways, the raceway space occupied by the balls being less than the length of the raceway, the hooked ends of the rear rod sections engaging the end balls in said raceway, whereby to equalize a pull on the wheel brakes on an actuation of the brake rods.

In witness that I claim the foregoing I have hereunto subscribed my name this 28th day of March, 1925.

ALBERT F. ANDERSON.